United States Patent [19]

Hillenbrand et al.

[11] Patent Number: 4,782,416

[45] Date of Patent: Nov. 1, 1988

[54] MAGNETIC HEAD HAVING TWO LEGS OF PREDETERMINED SATURATION MAGNETIZATION FOR A RECORDING MEDIUM TO BE MAGNETIZED VERTICALLY

[75] Inventors: Bernhard Hillenbrand, Uttenreuth; Herbert Schewe, Herzogenaurach, both of Fed. Rep. of Germany

[73] Assignee: Siemens Aktiengesellschaft, Berlin and München, Fed. Rep. of Germany

[21] Appl. No.: 59,173

[22] Filed: Jun. 11, 1987

Related U.S. Application Data

[63] Continuation of Ser. No. 738,099, May 24, 1985, abandoned.

[30] Foreign Application Priority Data

Jun. 4, 1984 [DE] Fed. Rep. of Germany ....... 3420746

[51] Int. Cl.$^4$ ...................... G11B 5/127; G11B 5/147
[52] U.S. Cl. .................................... 360/125; 360/126; 360/123
[58] Field of Search .............. 360/110, 111, 112, 119, 360/122, 123, 125, 126

[56] References Cited

U.S. PATENT DOCUMENTS

| | | | |
|---|---|---|---|
| 4,219,855 | 8/1980 | Jones, Jr. ............................. | 360/123 |
| 4,287,544 | 9/1981 | Lazzari ................................ | 360/131 |
| 4,295,173 | 10/1981 | Romankiw et al. ................. | 360/123 |
| 4,589,042 | 5/1986 | Anderson et al. .................. | 360/125 |
| 4,631,612 | 12/1986 | Shiiki et al. ..................... | 360/122 X |
| 4,631,613 | 12/1986 | French ............................. | 360/122 X |

FOREIGN PATENT DOCUMENTS

| | | | |
|---|---|---|---|
| 0012910 | 7/1980 | European Pat. Off. . | |
| 0071489 | 2/1983 | European Pat. Off. . | |
| 0131716 | 1/1985 | European Pat. Off. ............ | 360/125 |
| 166890 | 1/1986 | European Pat. Off. ............. | 360/121 |
| 0139624 | 10/1980 | Japan ................................. | 360/125 |
| 0078613 | 5/1982 | Japan ................................. | 360/122 |
| 0127912 | 8/1982 | Japan ................................. | 360/122 |
| 220234 | 12/1983 | Japan ................................. | 360/122 |
| 0077017 | 5/1983 | Japan ................................. | 360/122 |
| 0024422 | 2/1984 | Japan ................................. | 360/122 |

OTHER PUBLICATIONS

IEEE Transactions on Magnetics: vol. Mag 16, No. 1, Jan. 1980, pp. 71-76 Iwasaki.
vol. Mag 17, No. 6, Nov. 1981., pp. 3120-3122 Lazzari et al.
vol. Mag 18, No. 6, Nov. 1982, pp. 1158-1163 Fujiwara et al.
vol. Mag 18, No. 6, Nov. 1982, pp. 1170-1172 Dugas et al.
vol. Mag 19, No. 5, Sep. 1983, pp. 2239-2244 Bromley
vol. Mag 16, No. 5, Sep. 1980, pp. 967-972 Potter et al.
vol. Mag 17, No. 6, Nov. 1981, pp. 2538-2540 Yamamori et al.
J. Appl. Phys, vol. 53, No. 3, 1982, pp. 2593-2595 Oshiki et al.

*Primary Examiner*—Robert S. Tupper
*Assistant Examiner*—Andrew L. Sniezek
*Attorney, Agent, or Firm*—Kenyon & Kenyon

[57] ABSTRACT

A magnetic head comprising a stratified buildup on a non-magnetic substrate for a recording medium to be magnetized vertically comprises a ring head-like conducting body for carrying magnetic flux having two magnet legs which comprise several magnetic layers with predetermined saturation magnetization and delineate a space in between, through which the turns of an at least largely flat write/read coil winding extend. With this head it is possible to generate a sufficiently large read voltage, wherein the same advantages are present as if single-pole heads are used. The first magnet leg comprises, in the region of its pole, at least a first magnetic layer having a predetermined low saturation magnetization and the second magnet leg comprises, at least in the region of its pole, a magnetic layer, the saturation magnetization of which is larger than the saturation magnetization of the first magnetic layer of the first magnet leg, so that for the write function the pole area of the first magnetic layer is saturated magnetically due to a write current flowing in the coil winding. Preferably, the first magnet leg has, outside its pole area, at least one further magnetic layer comprising a material with a higher saturation magnetization.

9 Claims, 1 Drawing Sheet

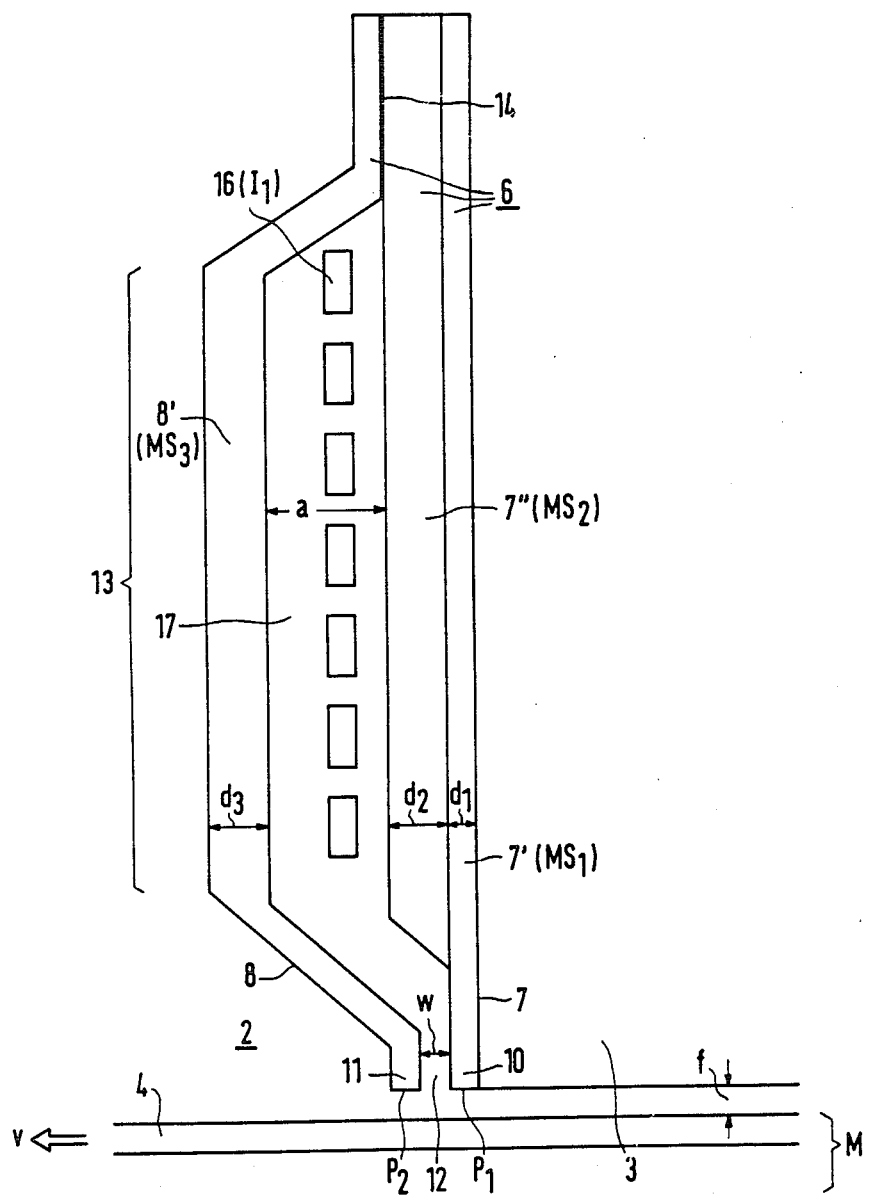

MAGNETIC HEAD HAVING TWO LEGS OF PREDETERMINED SATURATION MAGNETIZATION FOR A RECORDING MEDIUM TO BE MAGNETIZED VERTICALLY

This application is a continuation of application Ser. No. 738,099, filed May 24, 1985, now abandoned.

BACKGROUND OF THE INVENTION

The present invention relates to a magnetic bead constructed in layers on a non-magnetic substrate for a recording medium which is provided with a magnetizable storage layer, into which information can be written along a track by vertical magnetization; which magnetic head comprises a conduction body similar to a ring head carrying the magnetic flux, having two magnet legs which consist of several magnetic layers of high-permeability material of predetermined saturation magnetization and of which the poles facing the recording medium are arranged at a predetermined spacing from each other, one behind the other as seen in the direction of motion of the head, and which delineate a space in between, through which the turns of an at least largely flat write/read coil winding extend. Such a magnetic head is shown, for instance, in DE-OS No. 29 24 013.

The principle of vertical magnetization for storing information is generally known (see, for instance, "IEEE Transactions on Magnetics," vol. MAG-16, no. 1, Jan. 1980, pages 71 to 76; EP No. 0 012 910 Al or the above mentioned DE-OS . For this principle, which is often also called perpendicular magnetization, special recording media in the form of rigid magnetic discs, individual flexible discs (floppy discs) or magnetic tapes are required Such a recording medium comprises at least one magnetizable storage layer of predetermined thickness which contains a magnetically anisotropic material, especially of a CoCr alloy. The axis of the so-called easy magnetization of this layer is oriented perpendicularly to the surface of the medium. By means of a special magnetic head the individual informations are then recorded along a track as bits in successive sections, also called cells or blocks, by appropriate magnetization of the storage layer. In practice, the magnetic flux changes, i.e., the transitions from one direction of magnetization to the opposite one, are generally used as information. The bits so obtained have a predetermined extent in the longitudinal direction of the track, also called the wavelength. This dimension can be substantially smaller than (horizontal) storage by demagnetization. Thereby, the information density in the recording medium can advantageously be increased by the principle of vertical magnetization.

However, the write and read heads known for the principle of longitudinal magnetization, i.e., heads by which the write as well as the read function can be executed, cannot be used directly also for vertical magnetization. While, if these heads are used, which generally are of ring head-like shape, the flux conduction desired also with the principle of vertical magnetization to form a circuit as closed as possible with low magnetic resistance can be achieved, it is difficult, with high bit densities and a correspondingly small gap width of the ring head, to generate a sufficiently strong writing field.

One is therefore compelled to develop for the principle of vertical magnetization, special write and read heads, the magnet legs of which are advantageously built up in layers of materials with high relative permeability $u_r$ in the order of 1000 or more and or relatively high saturation magnetization of generally more than 10 kA/cm. An embodiment of a corresponding magnetic head suitable therefor has in general conduction body carrying the magnetic flux with magnet leg which forms the so-called main pole, by which the sufficiently strong vertical magnetic field for changing the magnetization of the individual sections of the storage layer is produced. The necessary magnetic return can then be accomplished, for instance, by means of a so-called auxiliary pole, which is, for instance, located on the same side as the main pole and is formed by a further magnet leg (see, for instance "IEEE Trans. Magn.,"-MAG-17, no. 6, Nov. 1982, pages 1158 to 1163; "J. Appl. Phys.," vol. 53, no. 3, 1982, pages 2593 to 2595, European Patent application No. 0 012 910 Al or DE-OS No. 29 24 013).

In this type of magnetic head with a shape of its conduction bodysimilar to a ring head, described for instance in the cited DE-OS, the auxiliary pole is to serve in any case only for the magnetic return of the flux. While a possible concurrent writing of this pole can optionally be tolerated if the recording main pole trails it and tberefore information written by the auxiliary pole can be overwritten, in order to largely suppress concurrent reading of the auxiliary pole with its trailing edge, the so-called air gap formed between the two poles would have to be relatively wide in order to ensure a far-reaching reduction of the magnetic flux density at the auxiliary pole. However, appropriately wide gap layers are difficult to realize in magnetic heads to be fabricated by a thin-film technique. In addition, the read signal attainable with magnetic heads of this type is generally relatively weak, since with this type the read as well as the write function must be executed by a single coil winding.

Because of these difficulties, magnetic heads have also been proposed in which the use of a separate auxiliary pole is dispensed with ("lEEE Trans. Magn.," vol. MAG-18, no. 6, November 1982, pages 1170 to 1172; European Patent application No. 0 071 489 A2). In this type of magnetic head only a single magnet leg facing the recording medium is provided with which, for instance, a planar write and read coil winding is associated. The necessary magnetic return is then accomplished by the stray flux. With such a magnetic head, also called a single-pole head, a field strength can be realized sufficient for recording with high bit densities for changing the magnetization of the storage layer and also a drop of the magnetic field at the trailing edge of the head as steep as possible is to be assumed such as for small transition widths of the magnetization reversal. (See, for instance, "IEEE Trans. Magn.," vol. MAG-19, no. 5, September 1983, pages 2239 to 2244). However, if the auxiliary pole is omitted, a sufficiently large read signal cannot be obtained with this head type.

Due to these mentioned problems in reading, systems are also known in which the function of writing and reading are executed by two separate heads. These heads can then be better adapted to the respective function (see for instance, "IEEE Trans. Magn.," vol. MAG-16, no. 5, September 1980, pages 967 to 972). Accordingly, ring heads known per se are used for reading, while writing can be carried out with the mentioned single-pole heads. A writing head suitable for this purpose has on its side facing the storage layer of the recording medium a main pole with a longitudinal dimension of, for instanc,, 3μm, opposite which a substantially larger auxiliary pole is located on the back side of the recording medium. The second ring head required only for reading, on the other hand, has a gap width of, for instance, 0.2 μm (see "IEEE Trans. Magn." vol. MAG-17, no. 6, November 1981, pages 2538 to 2540). Such systems for the magnetic reading and writing with special heads adapted to the respective function, however, are relatively elaborate as far as the mechanical design is concerned.

SUMMARY OF THE INVENTION

It is therefore an object of the present invention to improve the magnetic head mentioned above such that, for one, the mentioned problems with the combined heads regarding their mechanical design are reduced and, secondly, a switchable write and read function with relatively high efficiency is assured. In particular, a sufficiently large read voltage is therefore to be generated with this magnetic head, and the advantages present in single-pole heads are to be assured at least to a large degree.

These and other objects of the present invention are achieved by a magnetic head comprising a stratified buildup on a non-magnetic substrate for a recording medium, said medium being provided with a magnetizable storage layer into which information can be written along a track by vertical magnetization of the storage layer, the magnetic head comprising a ring head-like conducting body for carrying magnetic flux having first and second magnet legs comprising a plurality of magnetic layers of high-permeability material having predetermined saturation magnetization, the magnet legs each having a pole facing the recording medium, the poles being arranged one behind the other as viewed in the direction of motion of the head, the legs being spaced from each other with a predetermined spacing through which the turns of an at least largely flat write/read coil winding extend, the first magnet leg comprising, at least in the vicinity of its pole, at least a first magnetic layer having a predetermined, relatively low saturation magentization, the second magnet leg comprising, at least in the vicinity of its pole, at least one magnetic layer, the saturation magnetization of which is larger than the saturation magnetization of the first magnetic layer of the first magnet leg, whereby at least the region of the pole of the first magnetic layer of the first magnet leg is driven by a write current flowing in the coil winding into magnetic saturation.

Due to the various embodiments of the magnetic head according to the invention, the first magnetic layer of the first magnet leg with the low saturation magnetization is driven into saturation for writing already with a write current of very small magnitude at least in the region of the magnet pole. This region then acts like a barrier for the magnetic flux in this leg, so that this magnet leg, for all practical purposes, does not participate in the write function The magnetic head according to the invention then therefore writes the information advantageously into the medium with the other (second) magnet leg as a quasi single-pole head. Thereby, a good return of the magnetic flux is achieved, in that the closed flux conduction path of a ring head-like structure is assured except for the narrow air gap between the magnet poles. The open design present in the known single-pole heads, in which the return of the magnetic flux takes place via a large air section, is therefore avoided, so that the efficiency of the single-pole writing head according to the invention is increased accordingly.

Since flux changes are considerably smaller in reading than in writing, there is practically no danger that the magnet leg with the layer of the material having predetermined low saturation magnetization at its pole is magnetically saturated. The magnetic head according to the invention can therefore be operated in the manner known per se as a ring head with high efficiency, especially since the gap width between the two poles of the head can be kept very small.

BRIEF DESCRIPTION OF THE DRAWINGS

For a further explanation of phe invention, reference is made in the following description to the single drawing FIGURE, which shows an embodiment of the magnetic head according to the invention schematically illustrated in longitudinal section.

DETAILED DESCRIPTION

In the magnetic head for writing and reading, only partially detailed in the FIGURE, the starting point is a rin 1 head-like embodiment known per se with a layerwise design for the principle of vertical magnetization (see, for instance, the above mentioned DE-OS No. 29 24 013; European Patent application No. 0 012 910 Al or European Patent application No. 0 071 489 A2). The head generally designated with 2 is located on the flat side of a substrate 3 which forms the front or back side of a customary element designated as the flying body and is only indicated partially in the figure. This head can be disposed along a track at a low flying height f of, for instance, 0.2 μm relative to a recording medium M, known per se, which can be magnetized vertically. The recording medium M, for instance, a magnetic storage disc, comprises a storage layer 4 particularly of a Co-Cr alloy which can optionally be connected on its side facing away from the magnetic head 2 to further layers, for instance, of a special NiFe alloy. The relative direction of motion of the recording medium M conducted, for instance, under the head, with respect to the head is indicated by an arrow v.

The magnetic head 2 contains a conducting body 6 carrying the magnetic flux, having two magnet legs 7 and 8. These legs are oriented largely and, in particular, in their end regions 10 and 11 facing the recording medium M, at least approximately perpendicularly to the surface of the recording medium and form there respective magnet poles $P_1$ and $P_2$ Between these two poles, an air gap 12 with an advantageously small longitudinal width w of less than one μm, i.e. pointing in the direction of motion v, is formed, especially of less than 0.3 μm. In a center region 13 of the head, the distance between the two magnet legs 7 and 8 is increased over the gap width w in that, for instance, the magnet leg 8 to the rear with respect to the direction of motion leads in this region to a larger distance a relative to the front magnet leg 7 which is straight and is closest to the substrate 3. Outside this region 13, the magnet leg 8 is joined in a manner known per se on the side facing away from the recording medium M, to the magnet leg 7 in a connecting region 14, so that the ring head-like shape of the magnetic head 2 is obtained.

In addition, the magnetic head 2 contains, for the read function as well as for the write function according to the principle of vertical magnetization, and, in particular, a multilayer flat coil winding 16, the turns of which extend through the space 17 formed in the central region 13 between the two magnet legs 7 and 8.

According to the embodiment shown, the two magnet legs 7 and 8 of the magnetic head 2, together comprise at least three magnetic layers of high relative permeability $u_r$ with a minimum value of 1000 and preferably about 2000. It is assumed there that the first magnet leg 7 facing the substrate 3 consists of at least two magnetic layers 7' and 7", while the second outer magnet leg is formed by at least one magnetic layer 8'. According to the invention, the material of the magnetic layer forming the magnet pole of a magnet leg has, at least in the region of this pole, a low saturation magnetization MS of, for instance, less than 8 kA/cm and in particular less than 5 kA/cm, while the material of the magnet leg forming the other pole has a saturation magnetization as high as possible of, for instance, at least 10 kA/cm and preferably more than 11 kA/cm. Accordingly, the layer 7' of the (first) magnet leg 7 forming the magnet pole $P_1$ consists, according to the embodiment shown, of the material with the low saturation magnetization $MS_1$, wherein its thickness $d_1$ pointing in the direction of motion v is relatively small and amounts, for instance, to about 1 to 2 $\mu$m. On the other hand, the further magnetic layer 7" which is connected to the layer 7' outside the region 10 of the pole $P_1$ and can advantageously be provided, should consist of a material with a saturation magnetization $MS_2$ as high as possible, for instance, more than 11 kA/cm and preferably also should have a greater thickness $d_2$ in the direction of motion v than the layer 7' adjacent to it. The at least one magnetic layer 8' of the (second) magnet leg 8 which forms the pole $P_2$ and which has in the central region 13 a likewise larger thickness $d_3$ as compared to the thickness dl of the magnetic layer 7' comprises a material with a correspondingly high saturation magnetization ($MS_3$). Preferably, the thicknesses $d_2$ and $d_3$, which can also be obtained by means of several thinner layers, are always at least twice as large as the thickness $d_1$. During the writing, as assumed in the figure, the magnetic layer 7' is then saturated already with a very small current $I_1$ in the coil winding 16, especially since a corresponding increase of the magnetic field strength at least at the pole $P_1$ is connected with the formed tapering of the thickness of the magnet leg 7 from $d_1+d_2$ in the region 13 to $d_1$ in the region 10. The remaining magnetic layers 7" and 8' would be saturated only approximately at the current $I_2$ or $I_3$, for which approximately the following applies:

$$I_2 \approx \frac{MS_2}{MS_1} \cdot \frac{d_2}{d_1} \cdot I_1 \gg I_1$$

and $$I_3 \approx \frac{MS_3}{MS_1} \cdot \frac{d_3}{d_1} \cdot I_1 \gg I_1.$$

As can be seen from the above formulas, in addition to the choice of materials with predetermined saturation magnetizations according to the invention it must also be insured by higher values of the thicknesses $d_2$ and $d_3$ as compared to the thickness $d_1$ that, while the layer 7' with the pole area 10 is driven into saturation at a given write current $I_1$, the other layers 7" and 8' are not yet saturated. Due to these conditions, the magnetic head according to the invention then acts with its magnet leg 8 advantageously for all practical purposes like a single-pole magnetic head during writing and, via the further magnetic layer 7" of the first magnet leg 7, an improved conduction of the magnetic flux is obtained and thereby, the efficiency of the single-pole head is substantially increased as compared with the open design of known heads. During reading, on the other hand, the head works like an ordinary ring head with the well known high efficiency of, for instance, about 70%.

In the magnetic head according to the invention shown in the figure, it was assumed that its non-writing magnet leg 7 has, besides the magnetic layer 7' of a material with relatively low saturation magnetization $MS_1$, a further magnetic layer 7" which consists of a material with a relatively higher saturation magnetization $MS_2$. Optionally, however, such a further layer 7" can completely be dispensed with.

Accordingly, the magnetic leg 7 facing the substrate 3 in the figure, can also be provided as the writing leg, if its magnetic layer 7' and the further magnetic layer 7" which may optionally further be provided, consist of the material with the higher saturation magnetization. In this case, the outer magnet leg 8 must be made, at least in its end region 11, with the pole $P_2$ of the material with the lower saturation magnetization so that the following then applies: $MS_3 < MS_1$. It must be assured here that the trailing leg 8 no longer disturbs the information written by the first leg 7. The magnetic head according to the invention is advantageously fabricated with a thin-layer or thin-film technique known per se. The substrate used here consists, for instance, of TiC and $Al_2O_3$. For building up the magnet legs, thin magnetic layers of special alloys or magnetically soft amorphous materials of high permeability and the predetermined saturation magnetization are applied by sputtering, vapor deposition or electroplating to the substrate and separated from each other by non-magnetic intermediate layers. The easy direction of magnetication can be induced, for instance, when the respective layer is being applied, by an applied magnetic field. In general it is always perpendicular to the direction of the magnetic flux in the magnetic conducting body, i.e., in the vicinity of the magnet poles $P_1$ and $P_2$, substantially parallel to the surface of the recording medium M. The different grown layers are structured by techniques known per se such as photo lithography, plasma-, ion beam or wet chemical etching and thereby, the magnet legs of the head are formed. For fabricating the coil winding provided for the write and read function, layers of Cu or Al or Au are deposited and structured accordingly. The individual insulating layers further required for the construction of the magnetic head, especially the gap layer, are not detailed, however, in the figure for reasons of clarity.

It is a particular advantage for the production technology of the magnetic head according to the invention, that it corresponds largely to heads known heretofore for the longitudinal magnetization as far as its shape and design are concerned.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A magnetic head comprising a stratified buildup on a non-magnetic substrate for a recording medium, said medium being provided with a magnetizable storage layer into which information can be written along a track by vertical magnetization of the storage layer, the magnetic head comprising a ring-like conducting body for carrying magnetic flux having first and second magnet legs each comprising at least one magnetic layer of high-permeability material having predetermined saturation, said magnet legs each having a pole facing the recording medium, said poles being arranged one behind the other as viewed in a direction of relative motion of the head and medium, said poles being spaced from each other by a gap of having a width of less than 1 μm, said magnet legs being spaced from each other outside of a region of their poles with a predetermined spacing through which the turns of an at least largely flat write/read coil winding extend, said first magnet leg comprising, at least in the vicinity of its pole, at least a first magnetic layer with a thickness pointing along the direction of relative motion of at most 2 μm comprising a first material having a predetermined relative low saturation magnetization, said second magnet leg comprising, at least in the vicinity of its pole, at least one magnetic layer comprising a second material having a saturation magnetization which is larger than the saturation magnetization of the first magnetic layer of the first magnet leg, whereby at least the region of the pole of the first magnetic layer of the first magnet leg is driven by a write current flowing in the coil winding into magnetic saturation so that said first magnet leg executes substantially alone a write function whereas said first and said second magnet legs execute together a read function, said first magnet leg comprising, in addition to the first magnetic layer having low saturation magnetization, at least one further magnetic layer outside the region of its pole having a saturation magnetization which is larger than the low saturation magnetization of the first magnetic layer.

2. The magnetic head recited in claim 1, wherein at least one of the further magnetic layers of the first magnet leg and the at least one magnetic layer of the second magnet leg have respective saturation magnetizations. which are at least twice as large as the saturation magnetization of the first magnetic layer of the first magnet leg.

3. The magnetic head recited in claim 1, wherein the first magnetic layer of the first magnet leg comprises a material with a saturation magnetization of less than 8 kA/cm and preferably less than 5 kA/cm.

4. The magnetic head recited in claim 1, wherein at least one of the further magnetic layers of the first magnet leg and the at least one magnetic layer of the second magnet leg each comprise a material having a saturation magnetization of at least 10 kA/cm and preferably more tahn 11 kA/cm.

5. The magnetic head recited in claim 1, wherein the thickness of the first magnetic layer of the first magnetic leg is at most half as alrge as a thickness of the at least one further magnetic layer of said first leg or a thickness of the at least one magnetic layer of the second magnet leg outside of the region of the poles.

6. The magnetic head recited in claim 1, wherein the condcuting body compromises magnetically soft material.

7. The magnetic head recited in claim 1 wherein the conducting body has a conduction direction for the magnetic flux and comprises a material, the easy magnetization of which is oriented at least largely perpendicularly to the conduction direction of the magnetic flux.

8. The magnetic head recited in claim 1, wherein the conducting body comprises a material having a relative permeability which is at least 1000 and ferably at least 2000.

9. A magnetic head comprising a stratified buildup on a non-magnetic substrate for a recording medium, said medium being provided with a magnetizable storage layer into which information can be written along a track by vertical magnetization of the storage layer, the magnetic head comprising a ring-like conducting body for carrying magnetic flux having first and second magnet legs each comprsiing having predetermined saturation magnetization, said magnet legs each having a pole facing the recording medium, said poles being arranged one behinded the other as viewed in a direction of relative motion of the head and medium, said poles being spaced from each other by a gap having a width of less thna 1 μm, said magnet legs being spaced from each other outside of a region of their poles with a predetermined spacing through which the turns of an at least largely flat write/read coil winding extend, said first magnet leg comprising, at least in the vicinity of its pole, at least a first magnetic layer with a thickness pointing along the direction of relative motion of at most 2 μm comprising a first material having a predetermined relative low saturation magnetization, said second magnet leg comprising, at least in the vicinity of its pole, at least one magnetic layer comprsiing a second material having a saturation magnetization which is larger than the saturation magnetization of the first magnetic layer of the first magnet leg, whereby at least the region of the pole of the first magnetic layer of the first magnet leg is driven by a write current flowing in the coil winding into magnetic saturation so that said first magnet leg executes substantially alone a write function whereas said first and said second magnet legs execute together a read function.

* * * * *